Feb. 18, 1958            C. E. HALL            2,823,755
DOOR-OPERATED SAFETY DEVICE FOR MOTOR VEHICLES
HAVING PUSH-BUTTON CONTROLLED TRANSMISSIONS
Filed April 4, 1956
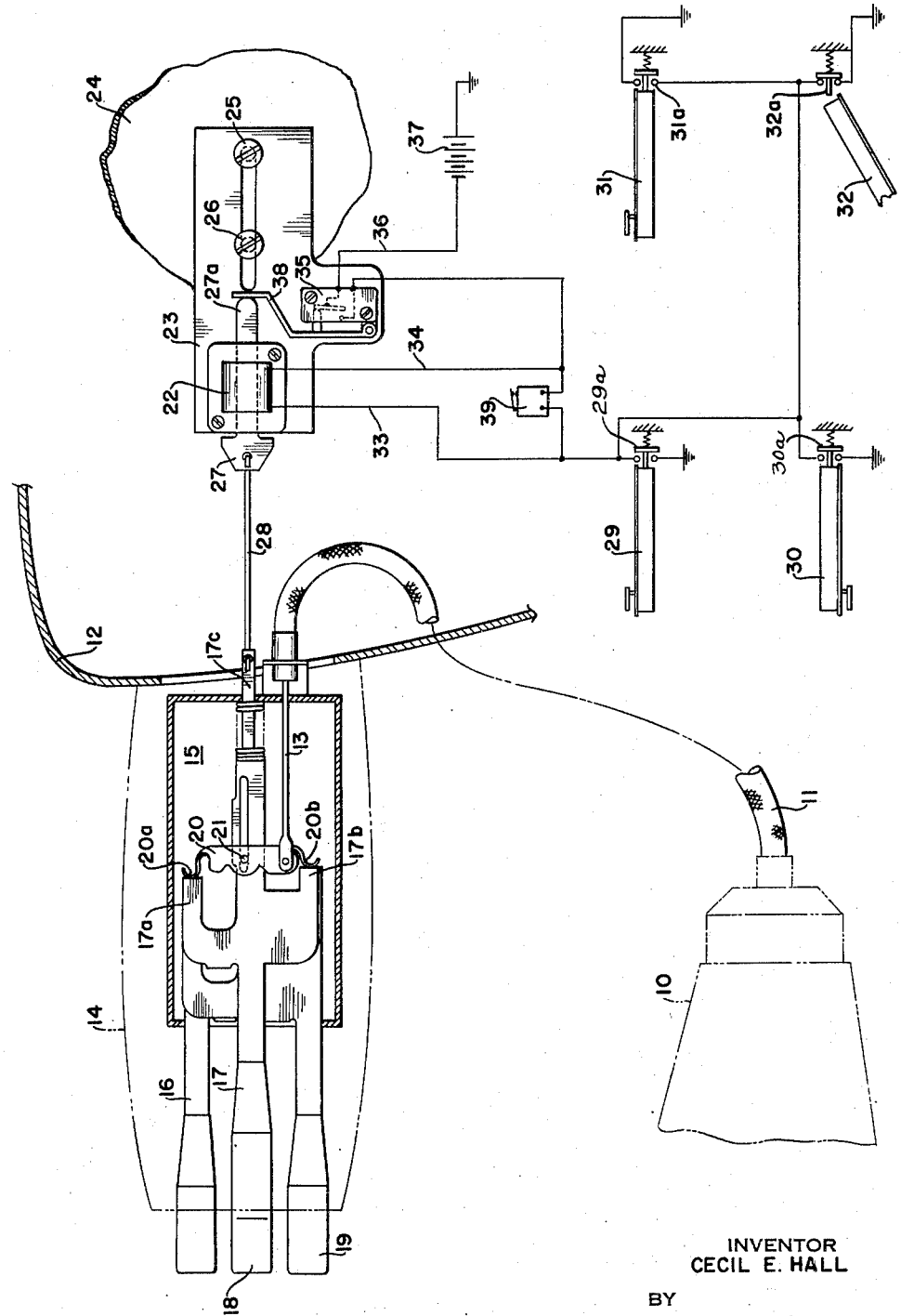
INVENTOR
CECIL E. HALL
BY
ATTORNEYS

United States Patent Office 2,823,755
Patented Feb. 18, 1958

2,823,755

DOOR-OPERATED SAFETY DEVICE FOR MOTOR VEHICLES HAVING PUSH-BUTTON CONTROLLED TRANSMISSIONS

Cecil E. Hall, Kingsville, Tex., assignor to Neutro-Gear, Inc., New York, N. Y., a corporation of New York Application April 4, 1956, Serial No. 576,092

2 Claims. (Cl. 180—82)

The present invention relates to automatic safety devices for motor vehicles, and more particularly to a novel apparatus for use in connection with a motor vehicle of the type having an automatic transmission, for the purpose of actuating the transmission to a neutral condition in response to the opening of a door of the vehicle.

Modern motor vehicles are often provided with automatic transmissions which permit the engine of the vehicle to operate at idling speeds while the vehicle is parked, even though the transmission is conditioned for driving. In many cases, however, the vehicle will tend to creep or move slightly if the vehicle is left in gear with the motor idling, and accidents are likely to occur when the driver leaves the vehicle unattended while in this condition.

Arrangements have been heretofore proposed for automatically turning off the engine of the vehicle or shifting the transmission to a neutral position when the driver leaves the car, in order to avoid possible accidents. However, such prior arrangements have been unsatisfactory in one or more respects, so that no such device or arrangement has found commercial acceptance, notwithstanding an acknowledged need and desire for such safety measures.

Accordingly, the present invention provides an improved, simplified and wholly practical arrangement for automatically shifting the automatic transmission of a motor vehicle to a neutral position when a door of the vehicle is opened.

More specifically, the present invention provides a novel and simplified electrically actuated apparatus for use in connection with motor vehicles having automatic transmissions and operative upon opening of any door of the vehicle to energize an electrical device for quickly shifting the transmission into a neutral position. As soon as the transmission is in a neutral position, the electrical device is automatically de-energized, so that unnecessary drain upon the electrical power system of the vehicle is avoided.

The invention finds its most advantageous application in vehicles having "push-button" automatic transmission. In this form, the invention includes a solenoid device mounted on a bracket behind the control panel of the vehicle and engaging the "neutral" button or lever of the transmission control from behind the panel. When any door of the vehicle is opened, the solenoid device is actuated to draw in on the neutral control and cause the transmission to be shifted to a neutral condition.

If desired, an alarm signal device may be provided so that an audible alarm is sounded when a door is opened while the transmission is in a gear other than neutral; optionally, the alarm may be employed in connection with the solenoid actuator or in place of the actuator. In the latter case the driver is adequately warned that the transmission is in gear, and has ample opportunity to apply the parking brake or take the vehicle out of gear before leaving.

For a better understanding of the invention, reference may be made to the accompanying drawing, in which the sole figure is a simplified schematic representation of a motor vehicle incorporating the new safety apparatus.

The motor vehicle represented in the drawing is of a type having an automatic transmission 10. The transmission 10 is of a purely conventional type and is adapted to be selectively shifted into driving gear, low gear, reverse gear or neutral. Control of the transmission is effected by means of a push-pull cable assembly 11 which extends upwardly behind the dashboard or control panel 12 of the vehicle and has a control cable 13 projecting outwardly through the panel 12. The cable 13 is adapted to be pushed or pulled to condition the transmission 10 in the desired manner.

In certain well-known types of motor vehicles a housing 14 is mounted on and projects outwardly from the control panel 12. The housing 14 encloses a transmission control mechanism 15 having a plurality of control elements 16—19 which project outwardly of the housing 14 and are adapted to be engaged and manipulated to change the position of the cable 13 in the outer sheath 11 and thereby change the operative condition of the transmission 10.

In the illustrated apparatus, the cable 13 is connected to a lever 20 pivoted on a rod 21 for movement about a horizontal axis. The lever 20 has abutment means 20a, 20b at its ends which are adapted to be engaged by projecting portions of the control elements 16—19 so that the lever 20 may be pivoted in one direction or the other about the axis of the rod 21. In the apparatus as illustrated the control element 17 has projecting portions 17a, 17b adapted to engage the abutments 20a, 20b, respectively, when the element 17 is pushed inwardly, so that the lever 20 is moved to an upright or vertical position; and for purposes of illustration it will be assumed that movement of the lever 20 to a vertical position will move the control cable 13 to a position in which the transmission 10 is in a neutral condition. To shift the transmission 10 to another of its operative conditions, any one of the other control elements 16, 18, 19 is pushed inwardly. This automatically releases the element 17 and then causes the lever 20 to be pivoted into a new position.

In accordance with the teachings of the invention, the transmission 10 is to be shifted into a neutral condition upon the opening of any door of the vehicle. To this end, a solenoid 22 is mounted behind the control panel 12, by means of a bracket 23 secured to the frame 24 of the vehicle with suitable bolts 25, 26. The solenoid 22 is mounted geenrally behind the transmission control mechanism 15 and has a movable armature member 27 adapted for movement along an axis generally aligned with the axis of movement of the neutral control button or element 17. A connecting link 28, which may be formed of rod, for example, is attached at one end to the armature 27 and at its other end to a projecting portion 17c of the neutral control element. The arrangement is such that the armature 27 will follow the movements of the neutral control element 17, and, likewise, the control element 17 will follow the movements of the armature 27. Accordingly, the armature 27 will be normally freely movable in the solenoid 22 so that the control element or button 17 may be manipulated manually in the usual manner.

In accordance with the teachings of the invention, each of the doors 29—32 of the motor vehicle is provided with a switch element 29a—32a adapted to be operated by the door in such manner that when any door is opened the switch element associated therewith is closed. The switches 29a—32a are connected in parallel, with one side of each switch being connected to ground, and each switch forms part of an electrical circuit which includes conductor 33, the energizing coil of solenoid 22, conductor 34, normally closed contacts of a switch 35, conductor 36, and the battery 37 of the motor vehicle power system. The arrangement is such that when the contacts of switch 35 are closed, the opening of any of the doors 29—32 of the vehicle will complete a circuit through the solenoid 22 to energize the latter and cause its armature member 27 to be drawn to the right. When the armature 27 is shifted to the right it acts through the connecting link 28 to pull the neutral control element 17 inwardly and thereby automatically shift the transmission 10 of the vehicle into a neutral condition.

As illustrated in the drawing, the movable armature 27 has a projecting portion 27a at its innermost or right-hand end. When the armature 27 shifts to the right, the projecting portion 27a thereof engages an operating arm 38 of the switch 35, which is mounted on the bracket 23 along with the solenoid 22. When the arm 38 is engaged and moved by the projecting portion 27a of the armature, the normally closed contacts of the switch 35 are opened to thereby break the energizing circuit for the solenoid 22. In this respect it will be understood that the switch 35, arm 38, and projecting portion 27a will be arranged so that the contacts of switch 35 open slightly before the armature 27 reaches the end of its inward travel. However, it is contemplated that the armature 27 will have sufficient inertia to continue its movement for a short distance following de-energization of the solenoid 22.

As an additional safety feature, a conventional buzzer or similar signal device 39 may be connected in parallel with the energizing coil of solenoid 22 so that an audible signal is produced when the coil 22 is energized. If the safety device operates properly, the signal device 39 will be energized for only a short instant following the opening of any of the doors 29—32 and before the opening of the contacts of the switch 35. However, if for any reason the parts of the mechanism should stick or otherwise fail to function properly so that the armature 27 moves through less than its full operating stroke, the signal device 39 will apprise the vehicle operator of this fact so that he may manually manipulate the transmission control to disengage the transmission 10. Optionally, the signal device 39 may be used without the solenoid 22 and allied apparatus, and in the latter case opening of any of the vehicle doors merely causes a warning to be sounded so that the vehicle operator is afforded an opportunity to manually shift the transmission 10 to a neutral condition before leaving the vehicle unattended.

The new safety device is of a relatively simplified nature, as will be readily appreciated, yet is wholly practical and effective for the purpose intended. The apparatus is most advantageously incorporated with the vehicle of the type having a push-button automatic transmission control including a control button or element which is pushed inwardly to shift the transmission into a neutral condition. In the new device, a solenoid actuator is conveniently mounted behind the control panel of the vehicle and is engaged with the neutral button or control element in such manner that upon energization of the solenoid the neutral control element is drawn inwardly to shift the transmission to a neutral condition in the manner desired.

As one of its important features the new safety device includes an electrical energizing circuit comprising normally open switches operable upon opening of one or more of the doors of the vehicle to complete a current path to the solenoid 22, and a switch 35 having normally closed contacts adapted to be opened whenever the neutral control element 17 is moved into its operative position. Thus, if a door of the vehicle is opened at a time when any control element other than the neutral element 17 is in operative position, the solenoid 22 will be energized to draw the neutral control element 17 inwardly, shifting the transmission to a neutral condition. Substantially simultaneously with the moving of the neutral control element 17 into its operative position, the contacts of switch 35 are opened by reason of the engagement of the arm 38 by the projecting portion 27a of the armature 27. This immediately de-energizes the solenoid 22 so that no further drain on the battery supply system of the vehicle is occasioned. On the other hand, whenever the neutral control element 17 is manually moved to its operative position before opening of any door of the vehicle, the contacts of switch 35 will be held open and the solenoid 22 will not be energized.

In addition to the above advantages, the new device may be inexpensively manufactured and installed. In this respect, it will be understood that in many instances the door-operated switches installed as part of the regular equipment of the vehicle may be employed in the solenoid energizing circuit.

It should be understood, however, that the specific apparatus herein illustrated and described is intended to be representative only. For example, the new safety device may be incorporated in the vehicle during the manufacture thereof, in which case the actuating solenoid may be positioned within the control housing 14, or in any other convenient place in the transmission control system. Reference should therefore be made to the following claims in determining the full scope of the invention.

I claim:

1. In combination with a motor vehicle of the type having an automatic transmission, a push-pull cable for setting operating conditions of said automatic transmission, said push-pull cable extending to the control panel of said vehicle and being operable from a position adjacent said control panel, a plurality of push-button control elements mounted on said control panel and adapted upon selective actuation to operate said push-pull cable, one of said control elements being adapted upon actuation to operate said cable for shifting said transmission to a neutral condition, said one control element being movable through a substantially fixed distance and being operable, when so moved in one direction, to operate said cable from any pre-existing position thereof to a position in which said transmission is in a neutral condition; an automatic safety device comprising a solenoid, bracket means rigidly mounting said solenoid behind said control panel adjacent said one control element, pulling means connecting said armature directly to said one control element whereby upon actuation of said solenoid said one control element is pulled through its substantially fixed distance of movement, said armature being independent of the other control elements, and a power circuit for said solenoid including the battery of said vehicle and a switch operable upon opening of a door of the vehicle to complete the power circuit.

2. In combination with a motor vehicle of the type having an automatic transmission, a push-pull cable for setting operating conditions of said automatic transmission, said push-pull cable extending to the control panel of said vehicle and being operable from a position adjacent said control panel, a plurality of push-button control elements mounted on said control panel and adapted upon selective actuation to operate said push-pull cable, one of said control elements being adapted upon actuation to operate said cable for shifting said transmission to a neutral condition, said one control element being movable through a substantially fixed distance and being operable, when so moved in one direction, to operate said cable from any pre-existing position thereof to a position in which said transmission is in a neutral condition; an automatic safety device comprising a solenoid, bracket means rigidly mounting said solenoid behind said control panel substantially directly behind said one control element, said solenoid having a movable armature, pulling means connecting said armature directly to said one control element whereby upon actuation of said solenoid said one control element is pulled through its substantially fixed distance of movement, said armature being independent of the other control elements, and a power circuit for said solenoid including the battery of said vehicle and a switch operable upon opening of a door of the vehicle to complete the power circuit.

References Cited in the file of this patent

UNITED STATES PATENTS

| | | |
|---|---|---|
| 1,373,099 | Ross | Mar. 29, 1921 |
| 1,433,130 | Gibson | Oct. 24, 1922 |
| 2,015,834 | Banker | Oct. 1, 1935 |
| 2,182,426 | Courcier | Dec. 5, 1939 |
| 2,514,963 | McRae | July 11, 1950 |
| 2,626,003 | Kutzer | Jan. 20, 1953 |
| 2,674,334 | Uberbacher | Apr. 6, 1954 |
| 2,708,005 | Gazzo | May 10, 1955 |
| 2,740,947 | Davies | Apr. 3, 1956 |